(12) United States Patent
Sanders

(10) Patent No.: US 10,907,121 B2
(45) Date of Patent: Feb. 2, 2021

(54) TWO VESSEL COMPACT BEER BREWING SYSTEM

(71) Applicant: SPARK IP HOLDINGS PTY LTD, Southbank (AU)

(72) Inventor: Julian Veysey Sanders, Camberwell (AU)

(73) Assignee: SPARK IP HOLDINGS PTY LTD.

( * ) Notice: Subject to any disclaimer, the term of this patent is extended or adjusted under 35 U.S.C. 154(b) by 207 days.

(21) Appl. No.: 16/081,942

(22) PCT Filed: May 17, 2016

(86) PCT No.: PCT/IB2016/052843
§ 371 (c)(1),
(2) Date: Sep. 3, 2018

(87) PCT Pub. No.: WO2017/153818
PCT Pub. Date: Sep. 14, 2017

(65) Prior Publication Data
US 2019/0055503 A1    Feb. 21, 2019

(30) Foreign Application Priority Data

Mar. 8, 2016 (AU) .................. 2016900869

(51) Int. Cl.
*C12C 13/10* (2006.01)
*C12C 7/04* (2006.01)
(Continued)

(52) U.S. Cl.
CPC ............... *C12C 13/10* (2013.01); *C12C 7/04* (2013.01); *C12C 7/14* (2013.01); *C12C 7/205* (2013.01); *C12C 7/26* (2013.01); *C12C 13/08* (2013.01)

(58) Field of Classification Search
CPC .. C12C 13/10; C12C 7/22; C12C 7/17; C12C 13/00; C12C 13/02; C12C 7/04;
(Continued)

(56) References Cited

U.S. PATENT DOCUMENTS 2,042,182 A * 5/1936 Knowles ............ G05D 23/2035
                                                    219/483
2,892,757 A * 6/1959 Markham .............. B01D 3/001
                                                    426/11
(Continued)

FOREIGN PATENT DOCUMENTS

DE         296 18 312 U1    11/1996
DE     10 2006 009 612 A1    9/2007
(Continued)

OTHER PUBLICATIONS

Extended European search report including the supplementary European search report, European Application No. 16893360.4, dated Oct. 15, 2019, 5 pages.
(Continued)

*Primary Examiner* — Ibrahime A Abraham
*Assistant Examiner* — Chris Q Liu
(74) *Attorney, Agent, or Firm* — Ware, Fressola, Maguire & Barber LLP

(57) ABSTRACT

A compact beer brewing system (1) has vessels (2, 3) configured to perform mashing, lautering and boiling brewing stages applicable in small scale craft brewing operations. The compact and cost efficient brewing system easily, precisely and repeatably controls and improves critical brew processes involved in brewing and serving by including a bottom vessel (2) having an inner tun (28) configured to perform mashing and boiling stages, a top vessel (3) positioned above the bottom vessel (2) in fluid communication with the tun (28) and configured to perform lautering stage,
(Continued)

and a pump (51) for moving fluid from the tun (28) to the top vessel (3). Preferably at least the bottom tun (28) and/or the top vessel (3) is/are substantially cylindrical, the diameter of the top vessel (3) is smaller than the diameter of the bottom tun (28) and the top vessel (3) is placed eccentrically over the bottom tun (28).

8 Claims, 3 Drawing Sheets

(51) Int. Cl.
    *C12C 7/14*         (2006.01)
    *C12C 7/20*         (2006.01)
    *C12C 13/08*       (2006.01)
    *C12C 7/26*         (2006.01)

(58) Field of Classification Search
    CPC ..... C12C 7/065; C12C 11/006; C12C 13/025; C12C 13/08; C12C 7/00; C12C 7/042; C12C 7/06; C12C 7/14; C12C 9/00
    USPC ........ 99/276, 277.2, 278, 277.1, 323.1, 277, 99/281, 322, 323.3, 348, 470
    See application file for complete search history.

(56) References Cited

U.S. PATENT DOCUMENTS

| | | | | |
|---|---|---|---|---|
| 4,494,451 | A * | 1/1985 | Hickey | C12C 7/00 426/30 |
| 4,542,683 | A * | 9/1985 | Wilkinson | C12C 7/065 426/16 |
| 4,653,388 | A * | 3/1987 | Wilkinson | C12C 13/00 426/16 |
| 4,681,066 | A * | 7/1987 | Widhopf | C12C 7/06 122/15.1 |
| 8,993,273 | B1 * | 3/2015 | Blichmann | C12C 7/042 435/93 |
| 2009/0285971 | A1 | 11/2009 | Broderick | |
| 2010/0126498 | A1 * | 5/2010 | Fleck | F28D 21/0014 126/618 |
| 2011/0247620 | A1 * | 10/2011 | Armstrong | A61M 16/0677 128/204.23 |
| 2012/0004755 | A1 * | 1/2012 | Noll | C12M 41/18 700/104 |
| 2014/0186505 | A1 * | 7/2014 | Banke | B01F 5/0057 426/429 |
| 2014/0234482 | A1 * | 8/2014 | Kempfert | C12C 13/10 426/16 |
| 2015/0000531 | A1 * | 1/2015 | Mitchell | C12C 11/006 99/276 |

FOREIGN PATENT DOCUMENTS

| | | |
|---|---|---|
| DE | 1020061009612 A1 | 9/2007 |
| JP | 62-289168 A | 12/1987 |
| JP | 2002-306151 A | 10/2002 |

OTHER PUBLICATIONS

Office Action prepared Dec. 23, 2019 by the Japanese Patent Office for counterpart application No. 2018-547967 (4 pages) and including English translation (3 pages), 7 pages total.
English Abstract for DE 10 2006 009 612 A1 (2 pages) extracted from Bibiligraphic Data (3 pages) obtained from DepatisNet, 5 pages total.
Hideo Fujisawa, "Historical Development of Brewing Equipment," including English Abstract on p. 2, The Surve Reports on the Systemization of Technologies, May 29, 2009, pp. 259-331, Issue No. 14, cited reference 2, 74 pages total.
Ikuya Yoshida, "Wort Production," The Journal of the Brewing Society of Japan, dated 2000, pp. 729-739, vol. 95, Issue 10,, including pp. 729-739 in Japanese language (11 pages), and including an English translation (4 pages) from p. 1 (729), second paragraph of left column to p. 3 (731), first paragraph of right column, 15 pages total.
Brazilian search report, Application No. BR112018068111-3, national phase of PCT/IB2016/052843 filed May 17, 2016, dated Dec. 10, 2019, 4 pages.
English translation of Brazilian Search Report dated Dec. 10, 2019, Non-Patent Literature Cite No. 1 above, 2 pages.
English Title and Abstract, Brazilian Application No. BR112018068111-3, 2 pages.
Bibliographic Data from DEPATISnet, Brazilian Application No. BR112018068111-3, 3 pages.
International Search Report (Form PCT/ISA/210) for application No. PCT/IB2016/052843, dated Aug. 3, 2016, 4 pages.
South Korean Office Action dated Oct. 8, 2020 for application No. 10-2018-7029102, citing (as D3) Foreign Patent Document Cite No. 1 (above), not already of record, 7 pages.
Bibliographic data from Japan Platform for Patent Information (J-Plat Pat) for patent application publication JP 62-289168 A published Dec. 16, 1987, including "(57) [Overview] Purpose and Constitution" in English, 1 page.

* cited by examiner

TWO VESSEL COMPACT BEER BREWING SYSTEM

The invention relates to a two vessel compact brewing system having vessels configured to perform mashing, lautering and boiling brewing stages applicable, in particular, to small scale commercial craft beer brewing and pub brewing.

BACKGROUND OF THE INVENTION

Brewing is an art as old as civilisation, involving the production of alcoholic beverages from water and a carbohydrate source. Recent scientific and technological development has allowed understanding and control of the sequential brewing process stages. These may be performed under specific conditions of time and temperature that are controlled via thermodynamics to influence the organic chemistry and microbiology involved, to achieve repeatable and desirable results.

In general, the first brewing stage involves milling malted or unmalted grains such as barley or wheat, then mixing them in hot water with optional adjunct carbohydrate supplements in a controlled steeping process known as mashing, which enables enzymes to convert the starch in the malt into sugars. During the second stage, lautering, the liquid from the mash, wort, is drawn off the grain and the grain bed is sparged with a top spray of additional hot water to rinse the grain bed and recover additional sugars. During the third stage, the sweet wort is boiled and hops are added to balance the malt sweetness with bitterness, as well as providing aroma and flavour. The boiled wort is then whirlpooled for further hopping before cooling, oxygenation, then inoculation with yeast to begin the fermentation process which creates beer to be chilled, carbonated and either packaged for distribution or served fresh directly on site.

Typically, a commercial brewery packages and distributes beer and the brewery design is optimised to minimise product unit cost. Such breweries require a skilled brewmaster and expensive, large scale equipment. Modern craft breweries are smaller and typically seek to broaden and enrichen the range of beer flavours. This can be facilitated by improvements in machine design and in thermodynamic control over the brewing processes.

U.S. Pat. No. 8,993,273 B1 for example discloses a two vessel brewing system for mashing grain into fermentable sugars, comprising a first vessel that is a mash tun; and a second vessel that is a boil kettle; said boil kettle having an open top, a closed bottom, and a lid positioned in physical contacting relationship with the open top of said boil kettle; wherein said mash tun has a closed bottom and a filter system, the mash tun's closed bottom being in physical contacting relationship with said lid of the boil kettle; a drain line communicating from said mash tun near the closed bottom of the mash tun into said boil kettle; a flow control mechanism positioned in said drainline; and a heating unit transferring heat to said boil kettle.

U.S. Patent application 2014/0017354 A1 discloses a system for brewing beer comprising: a base; a boil kettle positioned on the base; a first heating element in communication with the boil kettle and configured to selectively heat fluid contained in the boil kettle; a mash tun positioned on the base, the mash tun configured to receive one or more solid or fluid materials therein; a pumping system positioned at least partially within the base and connected to the boil kettle and the mash tun, the pumping system being operable to selectively pass fluid into, out of, and among the boil kettle and the mash tun; and a control system positioned at least partially within the base and configured to selectively control the first heating element and the pumping system. The base is preferably sized to occupy an area less than that of a kitchen countertop.

Compact, automated, all-grain beer brewing appliance is also disclosed in publication U.S. Pat. No. 9,228,163 B1, while publication U.S. Pat. No. 6,032,571 A discloses an automated machine for home beer brewing in a single vessel under automatic control.

It has been the object of the present invention to provide a compact and cost efficient brewing system that could be used easily, precisely and repeatably to control and improve all the critical brew process aspects.

Another object of the present invention is to provide a compact and cost efficient brewing system that provides integrated control of brewing, fermenting and serving at a single location.

SUMMARY OF THE INVENTION

In order to accomplish the aforementioned and other objects, a two vessel beer brewing system according to the present invention comprises a bottom vessel having an inner tun configured to perform mashing and boiling stages, a top vessel positioned above the bottom vessel in fluid communication with said tun and configured to perform the lautering stage, and a pump for moving fluid from said tun to said top vessel.

This provides a compact construction and minimises space and pump number requirements of the system.

As used in the context of this specification, "brewing stage" refers to all the processes that occur in a given vessel before or after the process fluid is transferred to the other vessel or out of the brewing system. Each of the "brewing stages" may therefore involve multiple "processes" that occur sequentially within the same vessel.

Preferably at least the bottom tun and/or the top vessel is/are substantially cylindrical, the diameter of the top vessel is smaller than the diameter of the bottom tun and the top vessel is placed eccentrically over the bottom tun.

This provides for easy access to the top of the bottom vessel and easy access to the side of the top vessel and the cylindrical shape of the vessels provides rotational symmetry for whirlpool creation for temperature homogeneity, ideal shape for effective clean-in-place automated washing and lowest production cost.

Preferably said bottom vessel comprises a top opening providing access to the its inner tun and positioned to be unrestricted by the top vessel.

Such a top opening enables convenient access for a brewer, in particular to stir the grist during the mashing stage and to hop the boil.

Preferably said top vessel is provided with a false bottom that conveniently retains grain during sparging.

Preferably said top vessel comprises a side orifice.

The side orifice enables convenient emptying of spend grain out of top vessel without it needing any tipping ability.

Preferably said side orifice extends over the perimeters of both vessels and is preferably located at height of arms of a man.

Preferably said side orifice is lined up with said false bottom of the top vessel.

Such a side orifice further facilitates access to the top vessel and presents a height and position to allow a brewer to rake the spent grain into a container conveniently, cleanly and ergonomically.

Preferably said bottom vessel further comprises a heating jacket disposed at least partially around said bottom tun.

Preferably said heating jacket is a fluid heating jacket, preferably an oil heating jacked powered by at least one electric heating element.

Such a heating jacket may use steam, steam and water, oil or any other fluid as a heat exchanging medium and enables for uniform heating of the content of the bottom tun.

Preferably said bottom vessel further comprises an internal fluid heat exchanger, preferably in the form of a water pipe disposed helically around the heating jacket.

This internal helical heat exchanger obviates the need for any additional hot liquor tun or separate hot water heater, rather hot water for sparging and cleaning, may be obtained in a controlled manner by heating it during passage through the heating jacket.

Preferably the bottom tun is provided with tangential inlet.

This enables for whirlpool creation in the bottom vessel if necessary.

Preferably the system further comprises a fluid heat exchanger external to the vessels.

This heat exchanger enables adding or removing heat from the recirculating fluid.

Preferably a base of said top vessel is further provided with at least one spray head.

Spray heads provide flow to the underlet plenum inside the top vessel below the false bottom to allow cleaning with the false bottom in place and also for lifting of the grain bed in the case of a stuck mash.

Potentially, the system includes a second pump, which while not necessary for typical embodiments of the brewing system described here, may compliment the first pump by being of a positive displacement design, optimised to facilitate transfer of very thick mashes.

Preferably the brewing system is further provided with a computer operated control system including a control unit and a number of sensors and providing control signals to system valves, pumps and other ancillary installations and components of the system.

BRIEF DESCRIPTION OF DRAWINGS

These and other features of the invention shall be presented below in exemplary embodiment and in connection with the attached drawings on which.

DETAILED DESCRIPTION BF THE INVENTION

Figure 1:
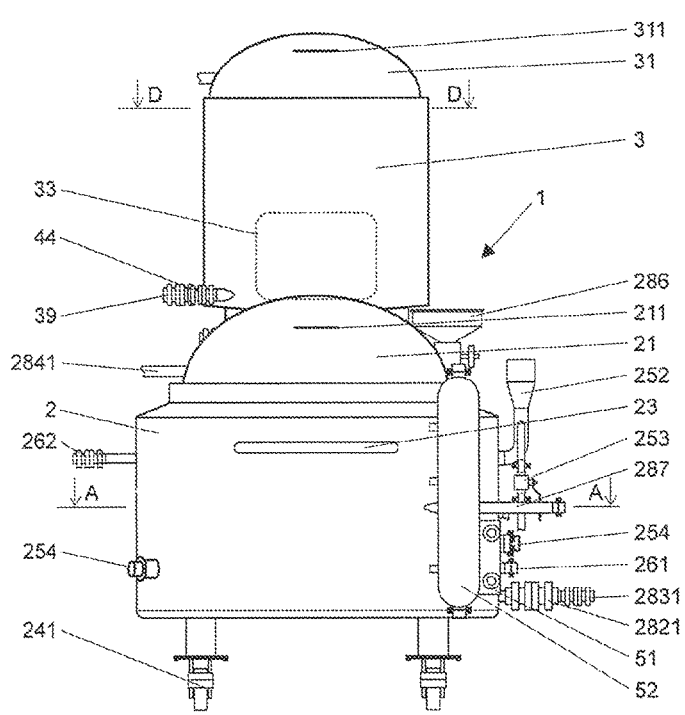
FIG. 1 is a schematic side view of an embodiment of a brewing system with the vessels hatches open.
Figure 2:
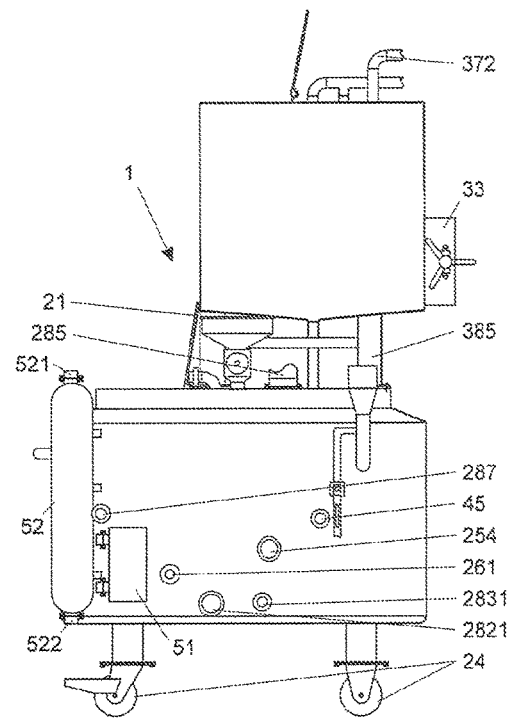
FIG. 2 is a schematic perpendicular side view of a brewing system shown in FIG. 1.
Figure 3:
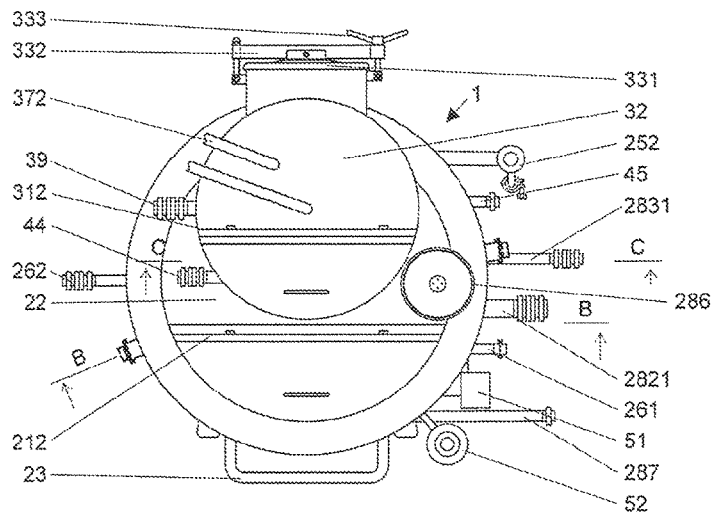
FIG. 3 is a schematic top view of a brewing system shown in in FIG. 1 and FIG. 2 with the vessels hatches closed.

An illustrated embodiment of the brewing system 1 comprises a bottom cylindrical vessel 2 and a top cylindrical vessel 3 eccentrically stacked over the bottom vessel 2 as shown in FIG. 2 and FIG. 3. Bottom vessel 2 is supported on wheels 24 provided with foot operated brakes 241 that stabilise the position of the system 1. Wheels 24 along with a handle 23 also allow for convenient displacement of the system 1 should the need arise.

Bottom vessel 2 is configured to perform mashing and boiling stages of the brewing process while top vessel 3 is configured to perform lautering stage which occurs between the mashing and boiling stages. Both vessels 2 and 3 are in fluid communication with each other in a manner that shall be explained later along with ancillary installations and components they are provided with.

Bottom vessel 2 is proved with a top opening in a form of a hatch 21 with a handle 211 and disposed pivotally on a hinge 212 over the top cover 22 of the vessel 2. Top vessel 3 is also proved with a similar hatch 31 with a handle 311 disposed pivotally on a hinge 312 over the top cover 32 thereof.

An out-off-centre (eccentric) stacking of vessels 2 and 3 provides a compact construction of the system 1, minimises its space requirements and enables for an easy access to the inside of the bottom vessel 2 through a hinged hatch 21 that may be required in particular for mash stirring and boil hopping. Furthermore the fact that the vessels 2 and 3 are arranged one above the other allows lautering with gravity between them, obviating any requirement for a second pump to draw wort off the grain during this process.

Side wall of the top vessel 3 is also provided with a side orifice 33 sealed during brewing by a cover 331 supported by a lever 332 with a screw 333. As shown in FIG. 2 and FIG. 3 the side orifice 33 extends over the perimeters of both vessels 2 and 3 and is placed at a height giving a brewer ergonomic access to the inside of the top vessel 3. As the bottom wall of the side orifice 33 (cf. FIG. 5) is aligned with a false bottom of the top vessel 3 a brewer may easily rake out any grain from the inside of the vessel 3 after removing the cover 331. To this end the side orifice 33 may also be provided with an additional chute (not shown) projecting downward from the bottom edge of the side orifice 33.

Figure 5:
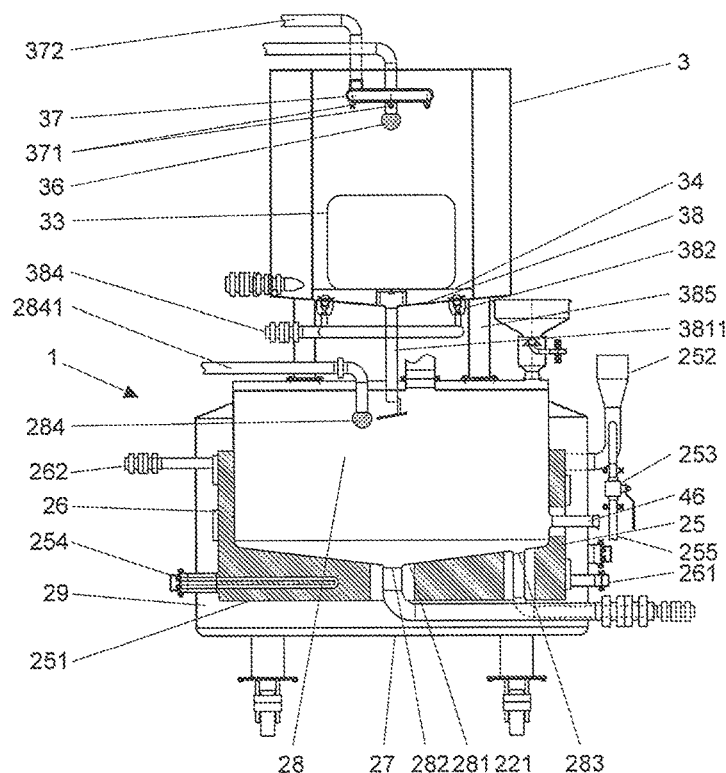
FIG. 5 is a schematic cross-sectional side view of the vessels of the brewing system along the planes B-B (bottom vessel) and C-C (top vessel) shown in FIG. 3.
Figure 4:
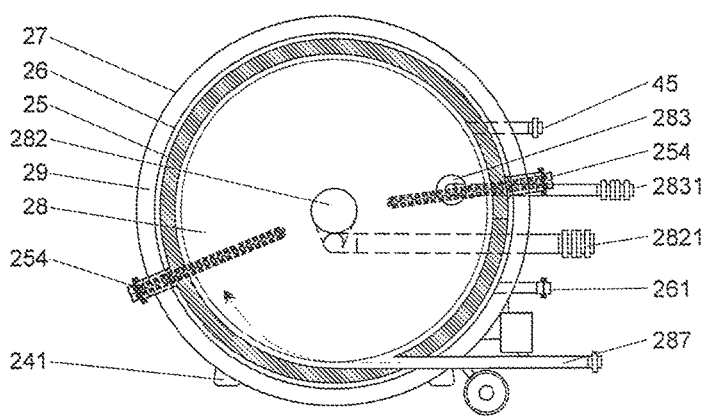
FIG. 4 is a schematic cross-sectional top view of the bottom vessel of the brewing system along the plane A-A shown in FIG. 1.
Figure 6:
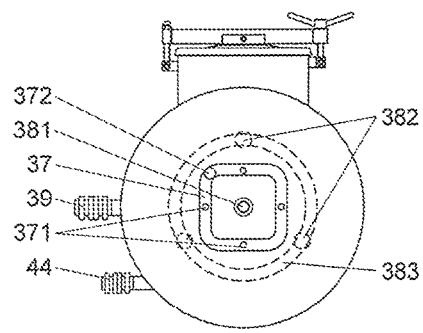
FIG. 6 is a schematic cross-sectional top view of the top vessel of the brewing system along the plane D-D shown in FIG. 1.

Referring now to FIG. 4 and FIG. 5 the bottom vessel 2 comprises a vessel or tun 28 in this embodiment having a volume of about 450 litres. In another embodiment it could be 600, 750 or more.

The tun 28 is surrounded by a heating jacket 25, which in this embodiment is powered with a heated oil and provided with a housing 251. The jacket 25 may be filled with oil through an oil inlet 252, while the oil excess may be disposed through an it overflow outlet 255 closed by manually operated valve 253. The temperature of the heating jacket 25 is controlled and maintained by two electric heating elements 254 each having a power output of approximately 20 KW, disposed radially inside the volume of the heating jacket 25. Obviously the heating elements 254 may be disposed higher than shown and extend further inside the volume of the inner tun 28.

The bottom vessel 2 is also provided with a helical tubular water pipe 26 disposed over the periphery of the heating, jacket 25 housing 251. The pipe 26 may be supplied with water through an inlet 261 and acts as an internal fluid heat exchanger for heating water which may be supplied through an outlet 262 to the top vessel 3 for sparging as shall be explained later. The heating jacket 25 along with water pipe 26 are surrounded by an insulation 29 and all the components of the bottom vessel 2, including the tun 28 are encased in an outer steel shell 27.

The tun 28 of the bottom vessel 2 has a conical base 281 with a central drain 282 and a peripheral drain 283 for transferring bright hopped wort to a fermenter, away from the pile of centrally deposited protein and hop material that forms after the whirlpool.

The tun 28 is also provided with a spinning spray ball 284 introduced through the top cover 22 of the bottom vessel 2 that allow clean-in-place (CIP) recirculation cleaning of the tun 28 the process of which may be automated.

The tun 28 is further provided with a vapour outlet 285 which may be coupled with an extract flue vented away from the brewery in order to prevent vapours from re-entering the bottom vessel 2 during brewing. Alternatively the outlet 285 may be coupled with a vapour condenser, piping vapours away to drain.

To supply the tun 28 with grist mixed thoroughly with hot water, it is provided with a grist hydrator 286 mounted to the top cover 22 of the bottom, vessel 2. The grist hydrator 286 comprises a funnel at the top where grist may be conveniently poured to the tun 28. The hydrator is supplied by water pipe which deflects the incoming hot water into a thin sheet to quickly and thoroughly hydrate the grist to form the mash.

The tun 28 and the heating jacket 25 are also provided with temperature sensors (not shown) disposed in thermowells 46 and 45. Sensors disposed in thermowells 46 are configured to measure the temperatures of the fluid in the bottom tun 28, while a sensor disposed in thermowell 45 is configured to measure temperature of the heating jacket 25.

The tun 28 is further provided with a tangential inlet 287 that allows the return flow of recirculating fluid to excite a whirlpool. This tangential inlet is shown in FIG. 4 with the recirculation inlet flow shown by an arrow.

The cylindrical top vessel 3 has, in this embodiment, a volume of about 300 liters. In another embodiment it could be 450, 600 or more.

As shown in FIG. 5 the vessel 3 has a conical base 38 provided with a central drain 381. Over the conical base 38, there is a slotted horizontal disk-shaped false bottom 34 to retain grain during sparging. As the top vessel 3 is used solely for the lautering stage of the brewing process which includes sparging, it does not need to be either heated or insulated.

The top vessel 3 is provided with a thermowell 44 provided with a temperature sensor (not shown), a spinning spray ball 36 for CIP recirculation cleaning of the vessel 3, a sparge arm 37 for sprinklers 371 to gently introduce sparge water to the top of the grain bed during lautering, a flow deflector 35 to allow gentle non splash filling of the vessel and a low level inlet 39 immediately above the false bottom 34.

The conical base 38 of the top vessel 3 is further provided with an inlet pipe 384 feeding spray heads 382 via a toroidal manifold 383 to provide flow to the underiet plenum inside the vessel 3 below the false bottom 34, to allow cleaning with the false bottom in place and for lifting of the grain bed with hot water during a stuck mash.

A pump 51 and a pipe network with a series of valves allows transfer of the process fluids and mash slurry between the vessels 2 and 3, recirculation within the bottom vessel 2 and transfer out of the brewhouse to drain or fermenter. An integrated clean in place (CIP) system with electrically actuated valves can allow recirculation of caustic cleaning solutions for automatic thorough cleaning and rinsing.

An optional second pump 54 of a positive displacement design facilitates transfer of thick mashes from vessel 2 to vessel 3.

Figure 7:
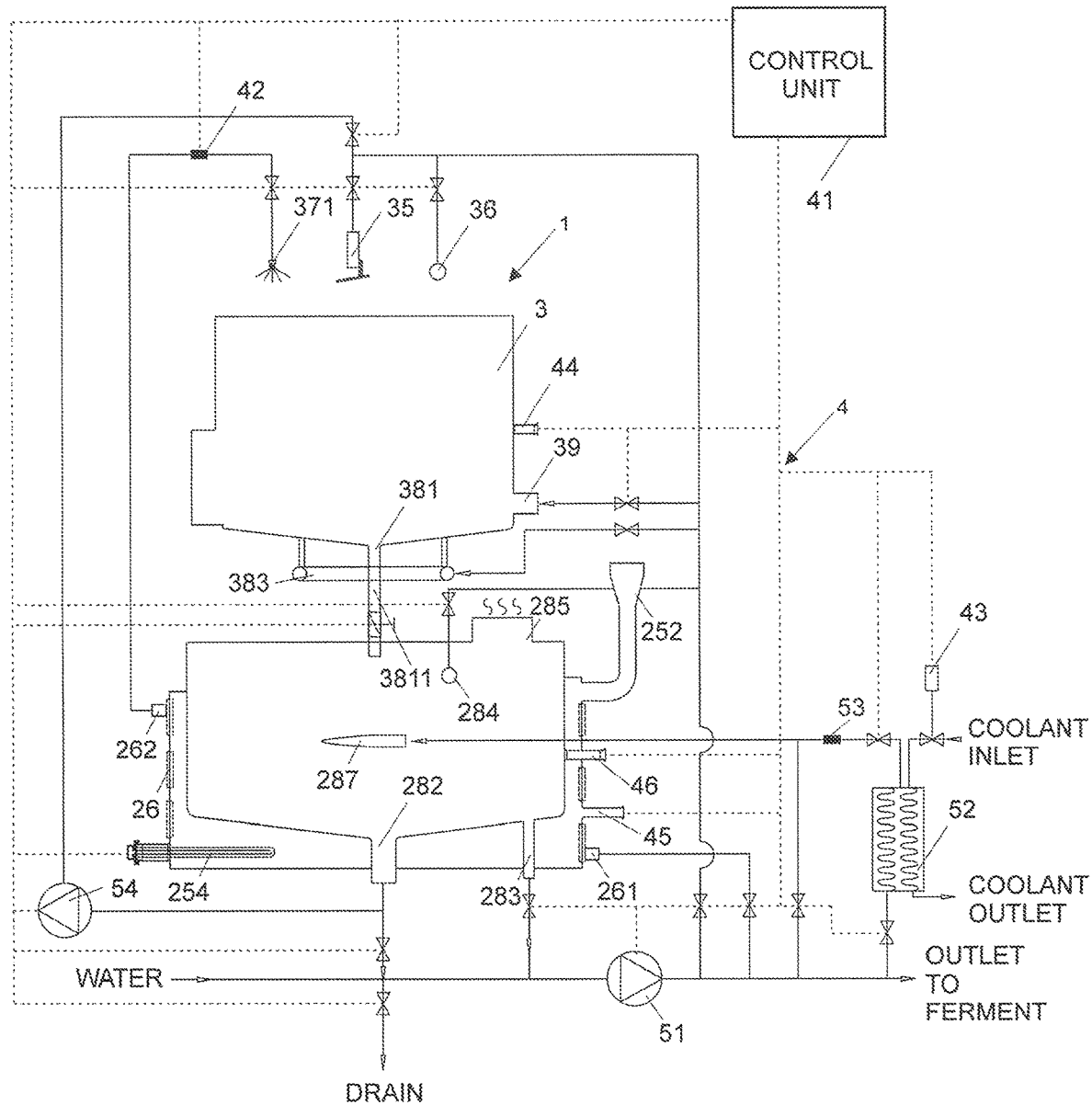
FIG. 7 is a schematic pipe and instrument diagram illustrating connections between various components of the embodiment of a brewing system shown in FIG. 1.

All the other ancillary components of the system 1 categorised under the group 5, along with features of the system shall be explained below with reference to the brewing process and in particular to FIG. 7 showing various sensors, components, valves and couplings of this embodiment of the brewing system.

As shown in FIG. 7 the system can be operated manually or may include a computer operated control system 4 including a control unit 41 gathering information from all the sensors of the system as well as providing control signals to system valves, pumps and other components 4, as well as powering the electric heating elements 254 which is schematically illustrated by dashed lines. The control system 4 can control not only the wort brewing apparatus, but also provide temperature and carbonation control of fermentation and serving tanks to facilitate pub brewing. For simplicity of the drawings valves shown in FIG. 7 are not referenced numerically. It is obvious however that their functionality shall be understood to those skilled in the art on the basis of the following description.

In the first stage grain and/or malted grain is milled to grist, introduced into the tun 28 of the bottom vessel 2 and then mixed with hot water at a specific temperature to form a mash.

To this end water is heated in tun 28 by the heating jacket 25. Water may be introduced to the tun 28 through the tangential inlet 287 or through the grist hydrator 286 as grist is poured into its funnel. The grist may then be manually and conveniently stirred by the brewer through the open hatch 21.

A single infusion mash with no heating may be performed, or alternatively, a step mash profile with sequential increasing temperature rests, each attained and then held, allowing specific enzyme groups to act in turn upon the grist.

During mashing, control unit 41 controls the temperature of the heating jacket 25 using electric heating elements 254 and temperature sensors positioned in thermowells 46 and 45 to attain the desired pre-programmed mash profile of ramps and steps, or a single infusion temperature for the desired mash duration, in order to convert the grain starches to simpler fermentable sugars. A final escalation to "mash out" temperatures may be used to reduce wort viscosity (to facilitate lautering) and to denature enzymes to fix the wort sugar profile.

The mash may also be recirculated via the tangential inlet 287 in order to provide temperature homogeneity and assist with breaking up any dough balls that might otherwise reduce extract efficiency and grow aerobic acetobacter to detrimental levels.

After mashing, the grist slurry is pumped up from the tun 28 out through the central base drain 282, the pipe 2821, to the low level inlet 39 of the top lauter vessel 3 using a pump 51.

The mash fluid, called first runnings, are allowed to fall back under gravity through the central drain 381 of the top lauter vessel 3, a coupling pipe 3811 to the bottom tun 28 after it has been rinsed free of grain.

Lautering to rinse additional sugars from the grain bed may be performed with sparge water being heated in the helical tubular water pipe 26 and introduced via outlet 262 from mains water pressure or using the pump 51, through feeding pipe 372 to the sprinklers 371 of the sparge arm 37 to be sprinkled onto the top of the grain bed to rinse remaining sugars from the grain.

The sparge water temperature is measured at the outlet 262 of the helical heat exchanger 26 by a temperature sensor 42 and controlled by adjusting the pumping speed and jacket 25 heating power to maintain desired sparge water temperature and sparge rate as the heating temperature in the heating jacket 25 decays throughout the sparging process.

These sparged second running are also collected in the bottom tun 28 through the central drain 381.

The sweet wort is heated by the heating jacket 25 to a boil and hopped according to a predetermined hopping schedule of one or more hop additions, with early boil additions providing more bittering through isomerisation of hop alpha acids, later additions retaining more volatile aromatic compounds to contribute aroma and flavour.

After boiling, heating of the heating jacket 25 is turned off and a whirlpool is formed by pumping the hopped wort out via the central drain 282 and back in via the tangential inlet 287 in the side of the tun 28. Further hop charges may be added throughout this process at different temperatures, with the control system 4 controlling the recirculation pumping rate as well as cold side cooling fluid flow to an external fluid heat exchanger 52 via, a coolant flow sensor (solenoid valve) 43 to attain a predetermined whirlpool cooling profile through temperature and time.

After whirlpooling and cooling, when the wort is at the desired temperature for fermentation, the cooling flow to external heat exchanger 52 is turned off and the cooled hopped wort may be recirculated through the spray ball 284 to oxygenate it through contact with the ambient air before the whirlpool is left to settle; to drop protein break material and hop material into the centre of the tun 28 such that clear wort may be drawn off from the peripheral drain 283 through a pipe 2831 for transfer to fermenter. The pumping speed and heat exchanger 52 cooling are controlled by the control system 4 to effect the desired hopping profile, hopped wort temperature and dissolved oxygen level. If desired, additional pure oxygen may be introduced through an inlet 53 to the hopped wort via the oxygenation sintered stone (not shown) during recirculation or as it is transferred to fermenter.

The above embodiment of the present invention is merely exemplary. The figures are not necessarily to scale, and some features may be exaggerated or minimised. These and other factors however should not be considered as limiting the spirit of the invention, the intended scope of protection of which is indicated in appended claims.

LIST OF REFERENCE NUMERALS 1 beer brewing system
2 bottom vessel
  21 hatch
    211 handle
    212 hinge
  22 top cover
  23 handle
  24 wheels
    241 brakes
  25 heating jacket
    251 housing
    252 oil inlet
    253 valve
    254 electric heating elements
    255 oil overflow outlet
  26 internal fluid heat exchanger (helical tubular water pipe)
    261 inlet
    262 outlet
  27 outer shell
  28 tun
    281 conical base
    282 central drain
      2821 pipe
    283 peripheral drain
      2831 pipe
    284 spinning spray ball
      2841 feeding pipe
    285 vapour outlet
    286 grist hydrator
    287 tangential inlet
  29 insulation
3 top vessel
  31 hatch
    311 handle
    312 hinge
  32 top cover
  33 side orifice
    331 cover
    332 lever
    333 screw
  34 false bottom
  35 flow deflector
  36 spinning spray ball
  37 sparge arm
    371 sprinklers
    372 feeding pipe
  38 conical base
    381 central drain
      3811 coupling pipe
    382 spray heads
    383 toroidal manifold
    384 inlet pipe
    385 supporting columns
  39 inlet
4 control system
  41 control unit
  42 temperature sensor (sparge water)
  43 coolant flow sensor
  44 top vessel thermowell
  45 heating jacket thermowell
  46 bottom tun thermowell
5 ancillary components
  51 pump
  52 external fluid heat exchanger
    521 inlet
    522 outlet
  53 oxygen inlet
  54 mash transfer pump (positive displacement or screw)

The invention claimed is:

1. An apparatus comprising a two vessel compact beer brewing system having vessels configured to perform mashing, lautering and boiling brewing stages, the system including
    a bottom vessel (2) having a tun (28) configured to perform mashing and boiling stages,
    a top vessel (3) positioned above the bottom vessel (2) in fluid communication with the tun (28) and configured to perform the lautering stage, and
    a pump (51) for moving fluid from the tun (28) to the top vessel (3),
    wherein the bottom vessel (2) comprises an opening (21) providing access to the tun (28) and wherein the opening (21) is a top opening and is positioned to be unrestricted by the top vessel (3) and the top vessel (3) is placed eccentrically over the tun (28);
    the top vessel (3) is provided with a false bottom (34) and comprises a side orifice (33) that extends over perimeters of the vessels (2, 3) and is lined up with the false bottom (34) of the top vessel (3);

a base of top vessel (3) is provided with at least one spray head configured to provide flow inside the vessel (3) below the false bottom (34); and wherein at least the tun (28), the top vessel (3), or both, are substantially cylindrical and the diameter of the top vessel (3) is smaller than the diameter of the tun (28).

2. The apparatus according to claim 1, wherein the bottom vessel (2) further comprises a heating jacket (25) disposed at least partially around the tun (28).

3. The apparatus according to claim 2, wherein the heating jacket (25) is an oil heating jacket, powered by at least one electric heating element (254).

4. The apparatus according to claim 3, wherein the bottom vessel (2) further comprises an internal fluid heat exchanger (26) that is a water pipe disposed helically around the heating jacket (25).

5. The apparatus according to claim 1, wherein the tun (28) is provided with a tangential inlet (287).

6. The apparatus according to claim 1, it further comprising a fluid heat exchanger (52) external to the vessels (2, 3).

7. The apparatus according to claim 1, further comprising a computer operated control system (4) including a control unit (41) and a number of sensors (42-46) and providing control signals to system valves, pumps (51, 54) and other ancillary installations and components of the system (1).

8. An Apparatus comprising a two vessel compact beer brewing system having vessels configured to perform mashing, lautering and boiling brewing stages, the system including a bottom vessel (2) having a tun (28) configured to perform mashing and boiling stages, a top vessel (3) positioned above the bottom vessel (2) in fluid communication with the tun (28) and configured to perform the lautering stage, and a pump (51) for moving fluid from the tun (28) to the top vessel (3), wherein the bottom vessel (2) comprises an opening (21) providing access to the tun (28);

wherein the top vessel (3) is provided with a false bottom (34) and comprises a side orifice (33), wherein the bottom vessel (2) further comprises a heating jacket (25) disposed at least partially around the tun (28), wherein the heating jacket (25) is an oil heating jacket, powered by at least one electric heating element (254), wherein the bottom vessel (2) further comprises an internal fluid heat exchanger (26), and wherein the internal fluid heat exchanger (26) is a water pipe disposed helically around the heating jacket (25).

\* \* \* \* \*